United States Patent [19]
Clemente

[11] Patent Number: 5,368,003
[45] Date of Patent: Nov. 29, 1994

[54] FUEL HEAT TRANSFER ASSEMBLY FOR AN INTERNAL COMBUSTION ENGINE

[76] Inventor: Roger Clemente, 11 Dorchester Way, Shrewsbury, N.J. 07702

[21] Appl. No.: 897,999

[22] Filed: Jun. 16, 1992

[51] Int. Cl.$^5$ ............................................. F02M 15/00
[52] U.S. Cl. ..................................... 123/541; 123/557
[58] Field of Search ................ 123/196 AB, 541, 557

[56] References Cited
U.S. PATENT DOCUMENTS 2,531,019  11/1950  Audet ........................... 123/196 AB Primary Examiner—Noah P. Kamen
Attorney, Agent, or Firm—Louis E. Marn

[57] ABSTRACT

There is described a fuel heat transfer assembly including conduits for fuel for a ground-moving vehicle having an internal combustion engine wherein the fuel heat transfer assembly is in gaseous flow communication with the cab compartment of the vehicle for passing fuel in indirect heat transfer relationship with climate control air from inside the cab compartment prior to introduction into the internal combustion engine to maintain fuel temperatures at from about 50° to 90° F.

12 Claims, 1 Drawing Sheet

FUEL HEAT TRANSFER ASSEMBLY FOR AN INTERNAL COMBUSTION ENGINE

BACKGROUND OF THE INVENTION

1. Field of the Invention

This invention relates to internal combustion engines for ground-moving vehicles, and more particularly, to a fuel heat transfer assembly for controlling fuel temperature to an internal combustion engine of a ground-moving vehicle.

2. Description of the Prior Art

Presently ground-moving vehicles having internal combustion engines operate over a wide range of external temperature conditions requiring diverse methods to maintain fuel quality and temperature. In summer months, internal combustion engines employing fuel injector systems commonly maintained fuel temperatures at lower levels by circulating the fuel from the fuel tank to the fuel injector pump to the fuel tank, basically mixing hot fuel from the injector pump with the cool fuel in the fuel tank. Such method may not be effective for many vehicle applications, particularly, for over-the-road trucks, since the fuel tank is now being positioned behind aerodynamic flaring units thereby blocking air flow. Elevation of fuel temperatures in the fuel tank to unacceptable levels, e.g., up to 140° F. result in poor engine performance and potential malfunction, particularly where new generation of diesel engines require fuel to cool engine electronics. Elevated fuel temperatures also effects mass flow fuel and volume to both a carburetor as well as fuel injection systems thereby decreasing engine performance as a function of fuel temperatures.

Another method to reduce fuel temperatures is the use of a heat exchanger assembly through which ram air is passed; however, placing a limitation on outside ambient air temperatures, i.e., at about 115° F., whereas it is impossible to reduce fuel temperature below 115° F. Additionally, at low temperatures, such a heat exchange assembly is not useful for raising fuel temperatures at low outside ambient air temperatures. During winter months, fuel oil may gel if not chemically treated or warmed. Chemical treatment may cause engine damage since most additives remove natural lubrication from diesel fuel.

Pre-heating assemblies for fuel for cold periods are accomplished by electric or engine coolant systems which are expensive to install and require a second system to keep fuel cool in summer months.

Temperature of the fuel to be used by an internal combustion engine is critical to engine performance. For fuel injection systems, elevated temperatures decrease fuel density (or its mass), making injector pump volume and compression more difficult. As fuel density decreases, so does the fuel mass droplet size or flow resulting in lower spray penetration and injector rate.

OBJECTS OF THE PRESENT INVENTION

It is an object of the present invention to provide a heat transfer assembly for maintaining fuel temperatures at a predetermined temperature range of from 50° to 90° F. for an internal combustion engine to thereby improve internal combustion efficiency and performance.

Another object of the present invention is to provide a heat transfer assembly for maintaining fuel temperatures to the internal combustion engine of from 50° to 90° F. at any environmental air temperature.

Still another object of the present invention is to provide a heat transfer assembly for maintaining predetermined temperature levels of fuel to an internal combustion engine of an over-the-road vehicle to substantially reduce emissions.

A still further object of the present invention is to provide a heat transfer assembly.

SUMMARY OF THE INVENTION

These and other objects of the present invention are achieved by a heat transfer assembly for fuel for a ground-moving vehicle having an internal combustion engine wherein the fuel heat transfer assembly is in fluid flow communication with the cab compartment of the vehicle for passing fuel in indirect heat transfer relationship prior to introduction with climate controlled air produced by the vehicle's heating and air conditioning system containing a heating coil to generate heat and an evaporator core using a refrigerant to absorb heat from inside the cab compartment prior to introduction into the internal combustion engine to maintain fuel temperatures at from about 50° to 90° F.

BRIEF DESCRIPTION OF THE DRAWINGS

A better understanding of the present invention will become more apparent by reference to the following detailed description when taken with the accompanying drawing wherein like numerals designate like parts throughout and wherein.

DETAILED DESCRIPTION OF THE DRAWINGS

Figure 1:
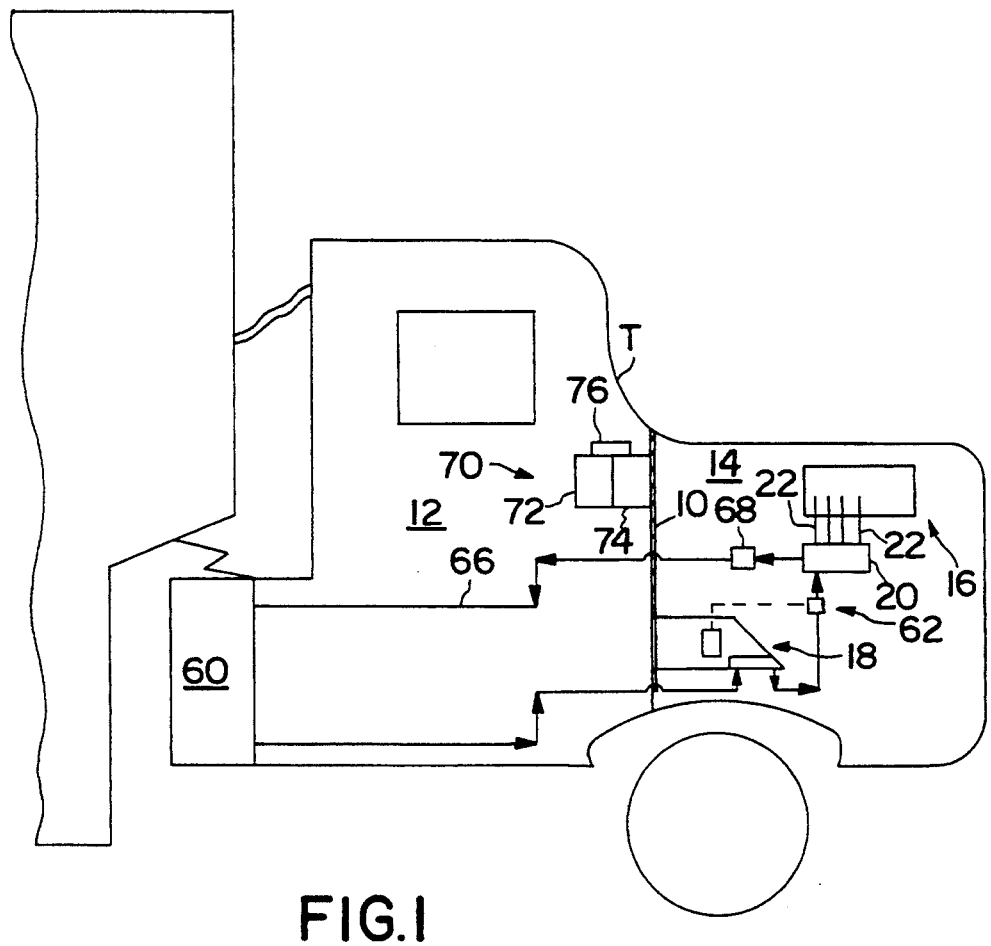
FIG. 1 is an elevational view of an over-the-road truck provided with a fuel heat transfer assembly of the present invention.
Figure 2:
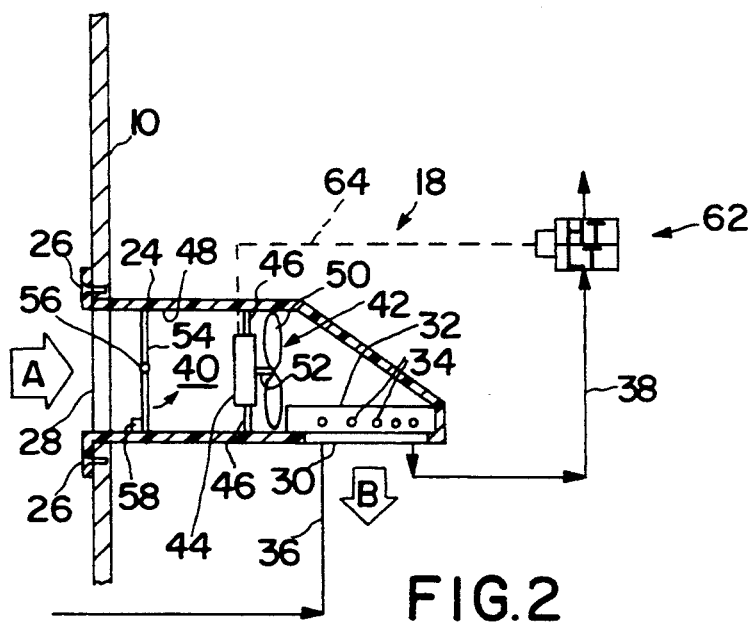
FIG. 2 is a partial schematic cross-sectional elevational view of the fuel heat transfer assembly of FIG. 1.

Referring now to the drawing, there is illustrated a truck cab (T) having a fire wall 10 defining a cab compartment 12 and an engine compartment 14. In the engine compartment 14, there is provided a diesel engine assembly, generally indicated as 16 and a fuel heat transfer assembly, generally indicated as 18, of the present invention and as more fully hereinafter described. The diesel engine assembly 16 is provided with a fuel injector pump assembly 20 for passing compressed fuel to the diesel engine assembly 16 via lines 22.

The fuel heat transfer assembly 18 is comprised of a generally cylindrically-shaped housing member 24 mounted, such as by screws 26, to the fire wall 10 of the vehicle. The housing assembly 24 may be formed of any suitable injection molded plastic material defining a gaseous inlet 28 and a gaseous outlet 30. Proximate the gaseous outlet 30, of the housing member 24, there is mounted a shell and tube type heat transfer assembly 32 including conduits 34 in fluid flow communication with a fuel inlet conduit 36 and fuel outlet conduit 38.

The housing member 24 defines a chamber 40 in which is disposed a fan assembly, generally indicated as 42, comprised of a motor 44 mounted, such as by support arms 46 to inner wall surface 48 of the housing member 24 and having a fan 50 mounted on a shaft 52 of the motor 44. A shutter member 54 mounted on a shaft 56 is mounted for counterclockwise rotation as hereinafter more fully described. A stop member 58 is provided on the lower portion of the inner wall surface 48 of the housing assembly 24 to stop clockwise motion of the shutter 54 past the vertical when the fan 50 is inoperative.

The conduit 36 is in fluid flow communication with the fuel tank 60, referring to FIG. 1. The conduit 38 is in fluid flow communication via a temperature sensing assembly, generally indicated at 62 with the fuel injector pump assembly 20. The temperature sensing assembly 62 is provided with two (2) temperature sensing components for monitoring predetermined low and high temperatures of fuel in the conduit 38. Preferably, temperature sensing component (LT) senses a fuel temperature below 50° F. to close a circuit 64 connected to the electric fan assembly 42 to thereby energize the motor 44 and to open the circuit 64 upon reaching a fuel temperature above about 60° F. The other temperature sensing component (HT) of the temperature sensing assembly 60 senses a fuel temperature above about 90° F. to close the circuit 64 and thereby energize the motor 44 and to open the circuit 64 upon sensing a fuel temperature below about 80° F. It will be understood by one skilled in the art that temperature levels of the sensing components of the temperature sensing assembly 62 may be selected as a function of motor size, fuel, etc.

The fuel injection pump assembly 20 is in fluid flow communication by line 66 including electric computer 68 with the fuel tank 60. Predetermined operational temperature levels of the electronic computer 68 is maintained by flow of recycled fuel as more fully hereinafter described.

In the cab compartment 14, there is provided the usual heating/cooling assembly, generally indicated as 70 comprised of an air conditioning evaporator 72, which utilizes a refrigerant to absorb heat, a heater core 74 to generate heat and associated fan assembly 76. In operation, assuming an outside temperature level of 115° F. the truck's air conditioning evaporator 72 and associated fan assembly 76 are in operation to reduce inside temperature of the cab compartment 14 to a lower level, for example, of from 65° to 75° F. With fuel in conduit 36 being passed to the injector pump 20 via heat transfer assembly 32 including conduit 38, should the temperature level of the fuel, as sensed by the temperature sensing assembly 62 exceed 90° F., the fan assembly 42 is activated to cause cool air from within the cab compartment 14 which is below outside ambient temperature to enter (arrow "A") the heat transfer housing 24 and exit (arrow "B") into the engine compartment 14 and thereby pass in indirect heat transfer with fuel in the conduits 34 of the heat exchanger assembly 32 to thereby cool the fuel being passed to conduit 38 and thence to the injector pump assembly 20. Excess cooled fuel in conduit 66 from the injector pump assembly 20 is cycled to the fuel oil tank 60, with such operation being continued to achieve a temperature level below about 80° F. and possibly lower, a temperature level of efficient fuel utilization, as hereinabove discussed. Upon reaching such a lower temperature level, the temperature sensing assembly 62 opens the circuit 64 with continued cycling of the heat transfer assembly 18 as necessary to maintain predetermined fuel temperature levels.

Conversely, on a cold day, for example, 0° F., the heater coil 74 of the heating/cooling assembly 70 is provided with heated coolant from the engine to maintain a temperature of from 65° to 75° F. in the cab compartment 12 under the control of fan assembly 76. With fuel in conduit 36 being passed to the injection pump 20 as hereinabove discussed, should the temperature sensing assembly 62 sense a fuel temperature below 50° F., the circuit 64 is closed to activate the fan assembly 42 and energize the motor 44 and thus heated air flows through the heat transfer assembly 32 to heat the fuel being passed by conduit 38 to the injector pump assembly 20. Excess heated fuel in conduit 66 from the injector pump assembly 20 is recycled to the fuel tank 60. Operation of the fan assembly 42 is continued until a higher temperature level e.g., about 60° F. is attained for the fuel in conduit 38 whereupon the temperature sensing assembly 62 opens the circuit 64 thereby denergizing the motor 44 of the fan assembly 42. Cycling of the heat transfer assembly 18 is continued to maintain a fuel temperature of at least about 50° F. at outside temperature levels below about 50° F.

As hereinabove described, excess fuel from the injector pump assembly 20, is recycled to the fuel tank 60 via the electronic computer 64 either heating and cooling the electronic computer 64 to maintain temperature levels of efficient operation. It will be understood that upon deactivation of the fan assembly 42, the shutter member 54 is caused to rotate in a clockwise direction thereby to essentially close the chamber 40 of the heat transfer assembly 18 and thereby prevent ram air from entering through the heat transfer housing assembly 24 into the cab compartment 12.

While the present invention is described in the context of maintaining fuel temperatures within a predetermined temperature range, it will be understood by one skilled in the art that the heat transfer assembly may be used to control or maintain predetermined temperature ranges of other liquids of the vehicle, such as crankcase oil, differential oils and the like.

While the present invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed:

1. A fuel heat transfer assembly for a vehicle including an engine, a fuel tank and a cab compartment having a heating/cooling assembly therefor, which comprises:
    a housing member for a heat exchanger conduit;
    gaseous conduit means for placing said cab compartment in gaseous flow relationship with said heat exchanger conduit of said housing member;
    means for effecting gaseous flow through said gaseous conduit means;
    conduit means for passing fuel from said fuel tank to said engine via said heat exchanger conduit of said housing member; and
    means for sensing temperature of said fuel during passage to said engine and for activating said conduit means for effecting gaseous flow past said heat exchange conduit.

2. The fuel heat transfer assembly as defined in claim 1 wherein said predetermined tempeature range is about 60° to 80° F.

3. The fuel heat transfer assembly as defined in claim 1 and further including conduit means for recycling fuel to said fuel tank in excess of engine requirements.

4. The fuel heat transfer assembly as defined in claim 3 wherein said conduit means for recycling fuel passes recycled fuel through a computer assembly.

5. The fuel heat transfer assembly as defined in claim 1 wherein said means for effecting gaseous flow is a fan disposed in said housing member.

6. The fuel heat transfer assembly as defined in claim 1 wherein said housing member includes a damper for controlling gaseous flow through said housing member.

7. The fuel heat transfer assembly as defined in claim 1 wherein said means for sensing fuel temperature includes a low temperature sensor and a high temperature sensor for activating said means for effecting gaseous flow at temperatures of 50° and 90° F. respectively.

8. The fuel heat transfer assembly as defined in claim 7 wherein said low temperature sensor and said high temperature sensor deactivate said means for effecting gaseous flow at temperatures of 60° and 80° F., respectively.

9. The fuel heat transfer assembly as defined in claim 1 wherein said housing member is mounted to a fire wall of said vehicle.

10. The fuel heat transfer assembly as defined in claim 1 wherein said housing member is cylindrically-shaped, defining a chamber for said means for effecting gaseous flow.

11. The fuel heat transfer assembly as defined in claim 10 wherein said housing member is mounted to a fire wall of said vehicle.

12. The fuel heat transfer assembly as defined in claim 10 wherein a damper is disposed in said chamber.

* * * * *